Figure 1:
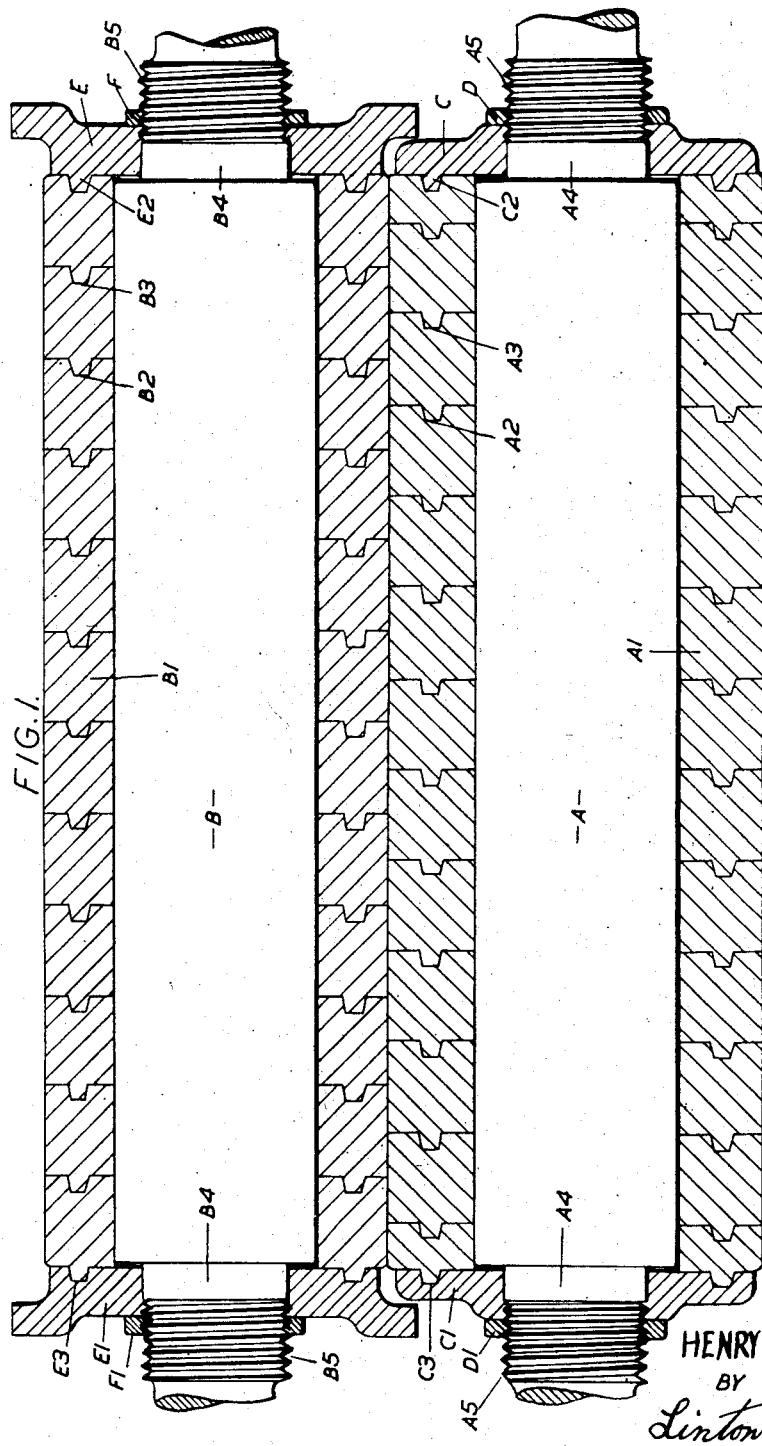

Nov. 10, 1953     H. CLEMENTS     2,658,262
RUBBER ROLLER

Filed April 4, 1952     2 Sheets-Sheet 1

INVENTOR
HENRY CLEMENTS
BY
Linton and Linton
ATTORNEYS

Nov. 10, 1953 — H. CLEMENTS — 2,658,262
RUBBER ROLLER

Filed April 4, 1952 — 2 Sheets-Sheet 2

INVENTOR
HENRY CLEMENTS
BY
Linton and Linton
ATTORNEYS

Patented Nov. 10, 1953

2,658,262

UNITED STATES PATENT OFFICE 2,658,262

RUBBER ROLLER

Henry Clements, Surbiton, England, assignor to Andre Rubber Company Limited, Surbiton, England, a British company Application April 4, 1952, Serial No. 280,530

Claims priority, application Great Britain April 4, 1951

1 Claim. (Cl. 29—119)

This invention relates to rubber rollers and more particularly to squeezing rollers that are used to expel moisture from substances such as are the squeezing rollers of wool washing and analogous plant.

The primary object of the invention is to provide a construction of rubber roller particularly suitable for use as a squeezing roller in a wool washing machine.

Other objects of the invention are to restrict the damage due to foreign bodies passing between a pair of rollers, to obviate the necessity for bonding the rubber covering of a roller, and to provide a roller which will operate efficiently at greatly reduced pressures, thus eliminating the necessity for employing expensive loading equipment such as hydraulic or other loading mechanism now frequently used in order to apply the requisite load to the rollers of a wool washing machine.

The squeezing rollers on a wool washing machine are subject to very heavy pressure in order to reduce to a minimum the liquor content in the raw wool which is passed between the rollers, and the conditions under which the wool is treated are such that very heavy pressure is sometimes localised, instead of being distributed over the whole roller surface, due to the wool being fed into the rollers as a comparatively uncontrolled mass in which are present lumps and heavy concentrations.

When the conventional metal scouring rollers are covered with "Lincoln Wool Tops" these concentrations of wool and the localisation of pressure result in rapid deterioration and early failure of the covering and the maintenance of the rollers becomes a serious item. Furthermore, the short life of these wool top coverings makes their replacement expensive.

In an effort to overcome these difficulties, rubber in the form of a homogeneous covering has been vulcanised and bonded on to metal rollers, but the stresses are sometimes such that the bond has failed and when the surface of a roller was damaged by foreign bodies passing between the rollers, as quite often occurs, the cut which was thereby formed in the rubber rapidly extended and the whole covering peeled off. It is quite common for nails and other pieces of metal to pass through the "nip" of the rollers invariably resulting in damage to the roller covering.

Accordingly, a rubber roller for use more particularly as a squeezing roller in wool washing plant is constructed with a covering consisting of a plurality of interengaging units of rubber assembled directly on a metal core between a pair of clamping cheek plates interengaging with their adjacent rubber units.

The term "rubber" is not intended to be limited to natural rubber. Synthetic rubber-like elastic polymers, particularly those having high mechanical strength and resistance to oils, may also be used.

Each of these rubber units may be moulded in the form of an annulus having one or more integral circumferential ribs on one side face and one or more complementary circumferential grooves on the opposite side face, one of the cheek plates being formed on its inner surface with one or more circumferential integral ribs to mate with the groove or grooves in the adjacent rubber unit and the other cheek plate being formed with one or more circumferential grooves to mate with the rib or ribs on the adjacent rubber unit, when the covering is assembled on the core.

Each rubber unit therefore consists of an annular section or ring having one or more axially projecting circumferential ribs and one or more axially projecting circumferential grooves disposed on opposite sides thereof.

The invention is illustrated, by way of example, in the accompanying drawings, in which Figure 1 is a longitudinal section of a pair of rollers arranged as is customary in the case of the squeezing rollers of wool washing and analogous machines, no part of a machine per se being shown.

Figure 2:
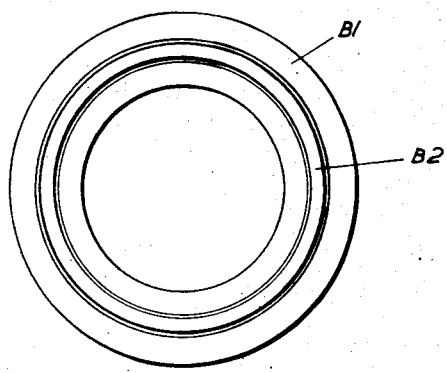
Figure 3:
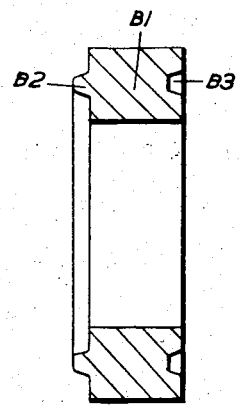
Figure 4:
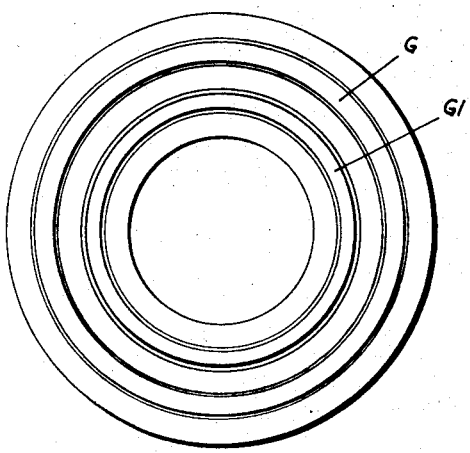
Figure 5:
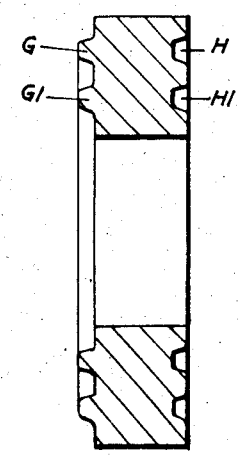

Figures 2 and 3 are, respectively, an end view and a longitudinal section of one form of rubber unit and Figs. 4 and 5 are similar views of a modified form of rubber unit.

Referring to Figures 1, 2 and 3 of the drawings A and B represent, respectively, the driving and the driven shafts of the pair of squeezing rollers, upon which shafts are assembled with a sliding fit a series of annular rubber units A1, B1, of a determined hardness, the units A1 being formed on one face with an axially projecting circumferential truncated tapered rib A2 and on the opposite face with a complementary groove A3, and the units B1 being formed with a similar rib B2 and a similar groove B3, whereby interfitting engagement of the several units of each series is effected.

At its opposite ends the shaft A is reduced in diameter at A4 to receive annular cheek plates C and C1 each adapted to be displaced axially of and secured on the shaft by a nut D or D1 taking on to a screw threaded extension A5 of the reduced end A4, the cheek plate C being formed on its inner face with an integral axially projecting circumferential truncated tapered rib C2 adapted to mate with the groove A3 in the adjacent unit A1 and the cheek plate C1 being formed on its inner face with a truncated tapered groove C3 adapted to mate with the rib A3 on the adjacent unit A1.

At its opposite ends the shaft B is reduced in diameter at B4 to receive annular cheek plates E or E1 adapted to be displaced axially of and secured on the shaft by a nut F or F1 taking on to a screw threaded extension B5 of the reduced end B4, the cheek plate E being formed on its inner face with an integral axially projecting circumferential truncated tapered rib E2 adapted to mate with the groove B3 in the adjacent unit B1 and the cheek plate E1 being formed on its inner face with a truncated tapered groove E3 adapted to mate with the rib B3 of the adjacent unit B1.

Instead of a single axially projecting circumferential rib and a single circumferential groove each annular rubber unit A1 or B1 may be formed, as shown in Figures 4 and 5, with two concentric ribs such as G, G1 and H, H1 respectively, or with more than two such ribs and a corresponding number of grooves, and the configuration of the rib or ribs and groove or grooves is not limited to that shown in the drawings. For example, parallel-sided ribs and grooves, or ribs having a semi-circular cross section and corresponding contoured grooves may be employed.

The degree of compression exerted axially of the rubber units by their associated cheek plates is so regulated as to permit one or more units to creep around the corresponding shaft and thereby to relieve objectionable stresses which may be built up during the operation of the rollers and at the same time to obviate or reduce the wear on the peripheral surfaces of the rollers such as is commonly inherent in the squeezing rollers employed at present in wool washing machines.

By means of the above described construction localised concentrations of wool along the roller are not serious owing to the fact that a large volume of rubber goes into the construction of a unit and individual units can deflect without lifting the roller and permitting wool at other points along the roller to pass through the "nip" of the rollers without being squeezed or liquor to pass between the rollers and wet the wool which has already been squeezed. The construction is such that the rubber units are compressed axially thus permitting a roller to be used as the driving roller of a pair of squeezing rollers since the units are restricted torsionally and can therefore drive the top roller frictionally without risk of uncontrolled slipping of the units on the core or shaft.

Another important advantage arising from the above described construction is the facility with which the rubber hardness can be varied to suit specific conditions. This can be very simply effected by detaching the units from their respective shafts and replacing them by other units having a different order of rubber hardness.

It has been proved in service that the loading pressure applied to the upper of a pair of squeezing rollers is governed to a large extent by the rubber hardness of the rollers and that as the hardness is reduced, resulting in greater conformability at the nip of the rollers, so the loading can be reduced, in consequence of which less mechanical wear of the moving parts occurs and a reduction in driving power can be effected. It therefore becomes possible for rags, high or low grade wool, or hanks, to be processed efficiently with a minimum amount of loading applied to the squeezing rollers.

Squeezing rollers constructed as described may be re-ground when the surface becomes uneven, and the life of the rubber units is considerably longer than that of rollers having coverings of wool tops or of a rubber bonded covering and whilst possessing the advantages of such coverings the invention affords greater efficiency by permitting a more uniform squeeze to be obtained when the rollers are properly set and adjusted on a wool washing machine.

What I claim is:

A resilient roller comprising a cylindrically shaped metal core for being rotatably supported, a series of similar annular units of elastomeric material positioned side by side and having said core extending through the bore formed by said units in relatively rotatable friction-tight engagement therewith with said units forming the entire cover for the periphery of said core, each of said annular units having integral circular ribs extending from one side face and circular grooves provided in the opposite side face with the ribs and grooves of adjacent annular units mating, a pair of cheek plates each having a central opening through which said core extends, one of said plates having annular grooves provided in the inner face thereof into which extends the ribs of one of the end units of said series of annular units, the other of said cheek plates having annular ribs provided on the inner face thereof which mate with the grooves of the opposite end unit of said series of annular units, and means for adjustably tightening said cheek plates longitudinally of said core against and compressing said series of annular units.

HENRY CLEMENTS.

References Cited in the file of this patent
UNITED STATES PATENTS

| Number | Name | Date |
| --- | --- | --- |
| 39,201 | Holly | July 7, 1863 |
| 769,680 | Bredannaz | Sept. 6, 1904 |
| 1,233,462 | Frommann | July 17, 1917 |
| 1,671,522 | Furbush | May 29, 1928 |
| 1,883,184 | Weber | Oct. 18, 1932 |
| 1,992,967 | Roy | Mar. 5, 1933 |
| 2,186,890 | Wilkie | Jan. 9, 1940 |
| 2,374,194 | Grupe | Apr. 24, 1945 |